United States Patent [19]

Prato

[11] 4,387,536
[45] Jun. 14, 1983

[54] MOTOR VEHICLE DOOR
[75] Inventor: Luigi Prato, Reano, Italy
[73] Assignee: Fiat Auto S.p.A., Turin, Italy
[21] Appl. No.: 281,686
[22] Filed: Jul. 9, 1981
[30] Foreign Application Priority Data
  Jul. 21, 1980 [IT]  Italy ............................ 53409/80[U]
[51] Int. Cl.³ .............................................. B60J 5/04
[52] U.S. Cl. ........................................ 49/502; 49/493
[58] Field of Search ................ 49/502, 488, 490, 440, 49/441, 492, 493; 296/146
[56]  References Cited
  U.S. PATENT DOCUMENTS 2,443,676  6/1948  Cosper ............................... 49/490 X
  2,542,906  2/1951  Cromwell ......................... 49/493 X
  2,994,555  8/1961  McClure ........................... 49/493 X
  3,793,772  2/1974  Kouth ............................... 49/490 X
  3,939,608  2/1976  Asakai et al. ...................... 49/493 X Primary Examiner—Philip C. Kannan
Attorney, Agent, or Firm—Merriam, Marshall & Bicknell

[57] ABSTRACT

A motor vehicle door provided with a window for closing a window aperture defined upperly by a tubular frame which on that side facing said window comprises a radial rib acting, together with said frame, as a support for a channel disposed substantially in line with the outer surface of the door and snap-fitted over said radial rib by means of a metal section having a substantially Z-shaped cross-section.

4 Claims, 2 Drawing Figures

MOTOR VEHICLE DOOR

BACKGROUND OF THE INVENTION

This invention relates to a motor vehicle door which is improved for reducing the aerodynamic resistance developed by the door during vehicle movement.

The structure of doors known at the present time is normally constituted by a lower part externally comprising a substantially flat continuous surface, and an upper frame which upperly surrounds a window aperture closed by a window. Said frame is normally constituted by two curved elements of U cross-section disposed with their concavity facing each other. These two elements are normally seamed together along their outer periphery, and along their inner periphery they comprise two facing flanges joined together by way of a U section, which receives a channel arranged to cooperate with the periphery of the window.

From the aforegoing description, it is apparent that in known doors, because of the fact that said channel is disposed between the flanges of elongated elements forming said frame, the window is withdrawn towards the interior of the motor vehicle relative to the outer surface of the door, and defines the base of a cavity the presence of which leads to the formation of stationary vortices during vehicle movement, which increases the aerodynamic resistance.

From the aforegoing description, it is also apparent that of the two said inner peripheral flanges of said two curved elements, one is visible from the inside and the other is visible from the outside of the vehicle, so that it is normally necessary to use two metal covering sections, an outer one and an inner one, in order to finish the appearance of the door.

SUMMARY OF THE INVENTION

The object of the present invention is to provide a door, the aerodynamic resistance of which is reduced to a minimum.

A further object of the present invention is to provide a door in which the reduction in aerodynamic resistance is accompanied by a reduction in the cost necessary for finishing the appearance of the door.

Said objects are attained according to the present invention by a motor vehicle door comprising a window aperture closed by a window and upperly defined by a tubular frame supporting a guide channel for said window and comprising two curved elements of substantially U cross-section disposed with their concavities facing each other, said two elements being seamed together along their outer peripheral edge, characterised in that said two elements are seamed together along their inner peripheral edge and define a rib extending radially inwards; said guide channel extending along said frame substantially in contact with said rib and on that side thereof facing outwards from the motor vehicle, support and connection means being provided for supporting said channel in contact with said frame and with said rib.

BRIEF DESCRIPTION OF THE DRAWINGS

Further characteristics and advantages of the present invention will be apparent from the description given hereinafter with reference to the accompanying drawing, which illustrates a non-limiting embodiment thereof and in which.

DETAILED DESCRIPTION OF THE INVENTION

Figure 1:
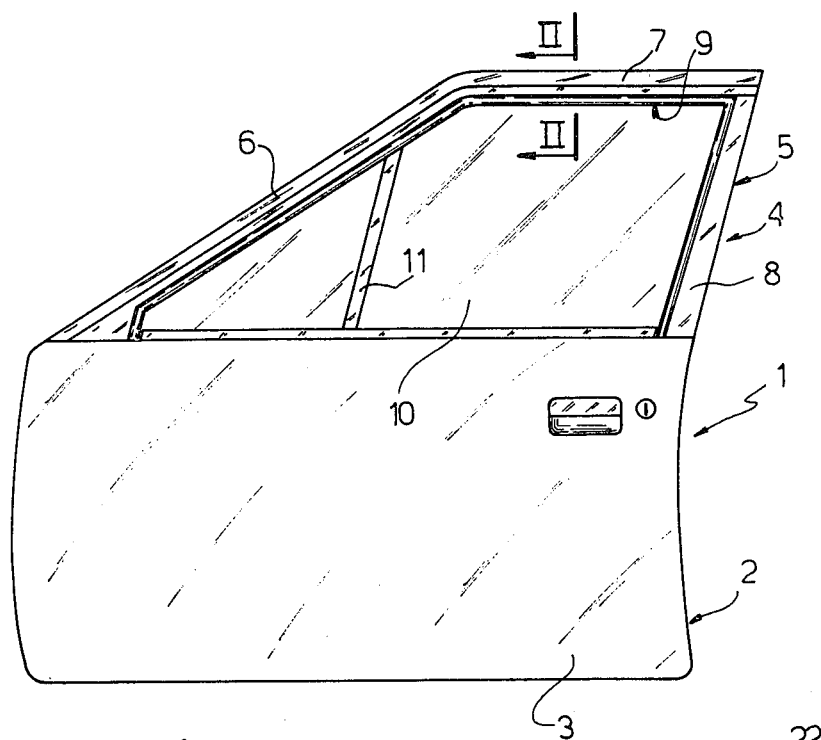
FIG. 1 is a side elevation of the outside of a motor vehicle door constructed in accordance with the present invention.

FIG. 1 shows a door 1 of a motor vehicle (not shown) comprising a lower portion 2 defined externally by a continuous metal sheet 3 of substantially rectangular shape, and an upper portion 4 rigid with the lower portion 2 and comprising a frame 5 constituted by a front inclined upright 6, a substantially horizontal upper cross-member 7, and a substantially vertical rear upright 8, the upper end of which is rigidly connected to the upper end of the upright 6 by means of the cross-member 7. This latter defines the upper end of a window aperture 9 closed by a mobile window 10 and defined lowerly by the lower portion 2, to the rear by the upright 8 and to the front by a channel guide 11 extending from the lower portion 2 parallel to the upright 8.

Figure 2:
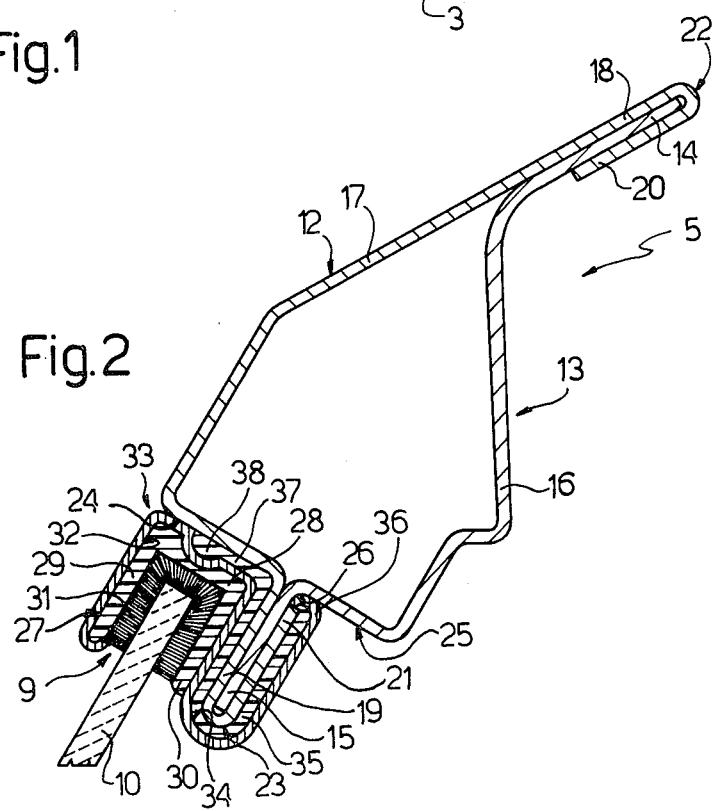
FIG. 2 is a section on the line II—II of FIG. 1 to an enlarged scale.

As shown in FIG. 2, the frame 5 is constituted by two facing curved elongated elements 12 and 13, of which the first faces towards the outside and the second faces towards the inside of the motor vehicle. The two elements 12 and 13 are of substantially U cross-section, and are disposed with their concavities facing each other in order to give the frame 5 a tubular structure. In particular, in cross-section the element 13 comprises an outer peripheral flange 14 and an inner peripheral flange 15 joined together by an intermediate concave portion 16, the concavity of which faces away from the motor vehicle. The element 12 comprises an intermediate concave portion 17 with its concavity facing the motor vehicle, and provided with two peripheral flanges 18 and 19 which face the flanges 14 and 15 and are respectively seam-jointed to these latter by folding the respective outer edges 20 and 21 to form two ribs 22 and 23 which extend in a radial direction from the frame 2 towards the outside and towards the inside of the window aperture 9 respectively.

As shown in FIG. 2, the rib 23 divides a substantially flat peripheral surface of the window aperture 9 into two portions 24 and 25, and on that side facing the portion 25 and the interior of the motor vehicle it comprises a longitudinal groove 26 defined, on the flange 15, by the portion 25 and by the free end of the edge 21 of the flange 19.

A U channel 27 extends along the surface portion 24 to act as a guide for the periphery of the window 10. The channel 27 is disposed aligned with and in a position substantially coplanar to the guide 11, and comprises a web 28 parallel to the portion 24 and having a width substantially equal to the width of this latter, and two flanges 29 and 30 facing towards the inside of the window aperture 9, the second being disposed facing the rib 23.

The channel 27 comprises internally a layer 31 arranged to cooperate with the surface of the window 10, and is snap-inserted into a slot 32 in a preferably metal section 33 which is substantially of Z cross-section so as to define a second slot 34 to the side of the slot 32, but having its concavity facing in the opposite direction to this latter, i.e. towards the outside of the window aperture 9. The slot 34 receives the rib 23 by way of a U section 35, preferably constructed of resilient material, the rib 23 enabling the section 33 to be snap-fitted to the frame 5 by snap-engaging a bent edge 36 of the section 33 into the groove 26.

The section 35 is provided with a side flange 37 disposed between the surface portion 24 and the outer surface of the section 33, and having a bead 38 engaged in a corresponding recess provided along the section 33 at the base of the slot 32 in order to prevent the section 33 from deforming, and thus moving transversely to the rib 23.

From the aforegoing description it is apparent that in the described door 1, not only is the window 10 disposed substantially in line with that surface of the door 1 which faces outwards from the motor vehicle so as to improve the aerodynamic characteristics of this latter, but in addition this result is obtained in an extremely economical manner because of the central positioning of the rib 23, which enables an outer frame and an inner finishing frame to be formed for the window aperture 9 by using a single section 33 which, if constructed for example of chromium-plated metal, contributes to the finished appearance of the door 1.

Within the principle of the invention, numerous modifications can be made to the described door without leaving the scope of the inventive idea.

What I claim is:

1. A motor vehicle door (1) comprising a window aperture (9) closed by a window (10) and upperly defined by a tubular frame (5) supporting a guide channel (27) for said window (10) and comprising two curved elements (12, 13) of substantially U cross-section disposed with their concavities facing each other, said two elements (12-13) being seamed together along their outer peripheral edge, characterized in that said two elements (12-13) are seamed together along their inner peripheral edge and define a rib (23) extending radially inwards that divides the surface of said frame (5) facing said window aperture (9) into a first portion (24) facing outwards from the motor vehicle and a second portion (25) facing the interior of the motor vehicle, said guide channel (27) extending along said frame (5) substantially in contact with said rib (23) and on that side thereof facing outwards from the motor vehicle, support and connection means (33) being provided for supporting said channel (27) in contact with said frame (5) and with said rib (23), and with said guide channel (27) having a substantially U cross-section and comprising two flanges (29-30) parallel to said rib and a web (28) extending along said first portion (24) and having a width substantially equal to that of this latter.

2. A door as claimed in claim 1, characterised in that said support and connection means (33) are in the form of a single section having a substantially Z cross-section defining two parallel slots (32-34) with their concavities in opposite directions; a first (32) of said slots snap-housing said channel (27), and the second (34) of said slots being snap-mounted over said rib (33).

3. A door as claimed in claim 2, characterised in that said rib (23) is covered by a laminar element (35), a part (37) of which extends along said first surface portion (24) and is provided with reference means (38) coupled to said section (33).

4. A door as claimed in claim 2, characterised in that on that side facing the interior of the motor vehicle, said rib (23) comprises a longitudinal groove (26) snap-engaged by an edge (36) of said Z section (33).

* * * * *